United States Patent Office 3,189,572 Patented June 15, 1965

3,189,572
HIGH GLOSS RETAINING ASPHALTS CONTAINING PHENOL-FORMALDEHYDE RESIN
Alan Philip Cramp, San Rafael, Calif., assignor to California Research Corporation, San Francisco, Calif., a corporation of Delaware
No Drawing. Filed June 28, 1962, Ser. No. 205,834
2 Claims. (Cl. 260—28)

This invention involves cutback asphalts retaining high gloss surfaces.

A desirable characteristic in asphalt is gloss retention. It is especially useful for asphalts intended as coatings on pipes and storage tanks. In general, the coatings must be hard, impervious to moisture, glossy and resistant to weather where the pipe or tank is exposed to it.

In the art of asphalt coatings one problem has been that most asphalts lose their gloss. This is undesirable as the manufactured product gives a poor surface. It is dull and appears to exude oil. The coating also cracks or "alligators." Some coatings are quite tacky.

Various attempts have been made to correct the lack of gloss retention. Different additives have been used before air blowing the asphalts. Some of the additives have been cotreated with asphalts. Others have been added at some point during treatment. In other cases resin constituents were added to the asphalt and reacted during the treating stage. Thus, the components reacted with each other, as well as with the asphalt. In most cases the glossy coatings have been rather poor. Some of them either sagged, cracked or "alligatored." They had poor weathering properties.

It has now been found that a high degree of gloss retention is maintained if a coating composition of 100% phenolic non-heat hardening phenol formaldehyde resin and asphalt is applied to a surface. It comprises a cutback asphalt derived from asphaltic base crude, having a penetration of from 0 to 50 at 77° F. (100 g., 5 seconds), a softening point of from 140 to 230° F. (R. and B.) and in an amount sufficient to improve a gloss retention, a 100% non-heat hardening phenolic-formaldehyde resin having a softening point of from 210° to 320° F., a specific gravity of about 1.05 to 1.10 and a Gardner color index of about from 7 to 12 in a 1 to 1 toluene concentration.

Further, the invention concerns the use of a coating composition comprising a cutback asphalt having an asphalt base of a penetration of from 0 to 30 at 77° F. (100 g., 5 sec.) softening point of from 210 to 250° F. (R. and B.) to which the non-heat hardening phenol formaldehyde has been added as well as a minor amount of linseed oil.

Additionally, the invention concerns the use of a coating composition comprising a cutback asphalt derived from asphaltic crude having a penetration of from 0 to 50 at 77° F., a softening point of from 140 to 200° F., and in an amount sufficient to improve gloss-retention, non-heat hardening phenol formaldehyde resin of a softening point of 210 to 320° F., and a specific gravity of at least 1.05 and less than 1.10.

The present results are due to a proper chemical and physical balance of the asphalt and the additive's properties. It is not known by what mechanism the desired properties are imparted.

The asphalt bases used for the present purpose are generally derived from asphalt stocks having medium low or low penetration. Low penetration asphalts are preferred. Generally, the asphalts obtained by processing crude residues are acceptable, if of proper penetration. Those obtained by air blowing are preferred. The following three types of asphalts are illustrative of the above described asphalts. Asphalt A is a medium soft asphalt derived from California crude. It has a penetration at 77° F. in the range of from 25 to 50 (100 g., 5 seconds), a softening point (R. and B.) in the range of 145 to 155° F., and a ductility at 77° F. of at least 15.

Asphalt B is likewise derived from a Western crude. It had a penetration at 77° F. in the range of from about 15 to 25 (100 g., 5 seconds), a softening point (R. and B.) in the range of 185 to 200° F., and a ductility at 77° F. of at least 3.

Asphalt C is derived from Western crude by steam blowing and vacuum reduction. It has a specific gravity at 1.07, a penetration at 77° F. in the range of from about 0 to 5 (100 g., 5 seconds), and a softening point (R. and B.) in the range of 200 to 220° F. The methods for obtaining these properties are described in Traxler's "Asphalt, Its Composition, Properties and Uses," Reinhold Publishing Company, New York, New York, 1961.

The cutback asphalts are prepared by using one of the above base asphalts and mixing it to dissolve in an aromatic type solvent. Suitable solvents are such as Aromatic Solvent A. Others are derived from petroleum fractions rich in arene compounds. Examples of suitable solvents are Solvent Extract B and Thinner C. All are described more fully below.

Aromatic Solvent A has the following physical characteristics. Initial boiling point 310° F., 70% recovered 320 to 330° F., dry point 350° F. (max.), mixed aniline point 53° to 60° F.

Solvent Extract B has the following characteristics. API gravity 36.9. Refractive Index 1.4741. End of 50% distilled at 330° F. Flash point is at about 110° F. It is a petroleum distillate derived from an aromatic rich fraction of the solvent having about 62% aromatics. Aniline point of the solvent is 31° F.

Thinner C is a Western petroleum distillate of an aromatic type having an initial boiling point of 310° F., a dry point of 388° F., mixed aniline point of 116.5° F. and a flash point (TCC) of 107° F.

The base asphalt is converted to a cutback containing 25% to 70% base. The preferred range of base asphalt is of from 30% to 65% of the mixture. The more preferred range is from about 35% to 60% of asphalt base in solvent.

It is generally well-known that the properties of phenol formaldehyde resins vary from use of the type of phenol to ratio of formaldehyde and type of catalysts used, as well as the degree of polymerization and processing conditions. Further, the phenolic-resin may be heat hardening and non-heat-hardening resins. Use of the two types would give different results.

The gloss improving agent is a new kind of phenol-formaldehyde resin. It is a non-heat hardening resin. It is known as 100% phenolic. The previously known resins of phenol and formaldehyde do not possess the characteristics of the present composition. The present resin on the other hand has properties that are outstanding for the purpose of retaining gloss and imparting high initial gloss.

One of the preferred phenol formaldehyde resins of this invention is known in the trade as Bakelite, 100% phenolic non-heat-hardening resin CKR–2103. It is an acid catalyzed resin prepared from an alkyl phenol and formaldehyde. Its softening point is of from 215 to 245°

F., and it has good drying speed. The resin's solubility is good in oils, aromatic hydrocarbons and alcohols. Its solubility in aliphatic hydrocarbons is limited. The pure resin film darkens on drying. Phenol formaldehyde composition has a specific gravity of about 1.07. A density of about 1.05 to 1.10 is often encountered. The resin has a Gardner color index of about 11 in a 1 to 1 ratio of toluene. The color is found according to Gardner 1933 Standard.

The other preferred resin is Bakelite CKM-2400. It is an acid catalyzed resin, 100% phenolic, non-heat hardening, prepared from an alkyl phenol and formaldehyde. It has a softening point of from 290° to 315° F. and has a fast drying speed. Its solubility is good in oils, aromatic hydrocarbons and alcohols. Its solubility in aliphatic hydrocarbons is limited. The resin has a specific gravity of about 1.08 and a Gardner color index of about 8 in a 1 to 1 ratio of toluene. The color is likewise determined according to Gardner 1933 Standard.

The asphalt contains of from 3% to 20% of the phenol formaldehyde resin. Sufficient gloss is obtained at 3%. Up to 20% of resin may be used. Above 10% the gloss retention is best.

Linseed oil is added to reduce the brittling tendencies of the coating. However, linseed oil tends to dull the surface. For this reason it is added only in minor proportions and no higher than 3% of the total mix.

The following examples are representative of the novel compositions.

EXAMPLE I

Cutback asphalt (Cutback A) is prepared by mixing 47 parts of Asphalt B to 53% Thinner A. Viscosity of the asphalt was about 75 to 100 seconds SSF at 77° F. To it was added 3% of CKR-2103 resin (described more fully above).

A screening test was carried out by spreading the composition on steel panels (2⅝ inches by 6 inches) to a thickener of 6 mils. After drying the films were approximately 3 mils thick. The panels were exposed to outdoor weather for two months. The weathering test failed when more than 5 pinholes were visible in the coating in an area of 2⅝ x 6 inches.

EXAMPLE II

The same procedure was followed as in Example I using cutback asphalt (Cutback B) consisting of 51 parts of Asphalt C (described above), and 49 parts of Solvent Extract B. The cutback had an initial viscosity of about 75 to 100 seconds SSF at 77° F. To the cutback was added 3% of CKR-2103 (described above). The composition was screened by spreading it on steel panels (2⅝ x 6 inches) to a thickness of 6 mils. After drying the films were approximately 3 mils thick. The panels were exposed to outdoor weathering for two months for the screening test (weathering test). If the panel contained more than 5 holes per slate the composition was rejected.

The following table shows other examples where the percentage of the additive is varied.

*Table I.—Screening test results on additives in Cutback B (Asphalt C and Solvent Extract B)*

| Compound | Concentration, percent | Effect on cutback |
|---|---|---|
| CKR-2103 and CKM-2400, phenol formaldehyde resins (Bakelite Co.). | 5 | Improved gloss. |
| Velsicol FG-5-16 [1] | 3-10 | Lowered gloss, causes alligatoring. |
| Velsicol GD-5-28 [2] | 3-10 | Do. |

[1] A non-oxidizing type solid synthetic resin of petroleum origin; about 210° F. melting point (Velsicol Corp.).
[2] Same as (3), but harder.

In the following table the claimed compositions are further varied and compared with other compositions which failed. Note that some phenol formaldehyde resins are inoperative.

*Table II.—Performances of additives at various concentrations in asphalt cutbacks*

| Compound | Concentration, percent | Base asphalt of cutback | Effect on cutback |
|---|---|---|---|
| CKR-2103 and CKM-2400 | 5-20 | Asphalt B | Improved gloss markedly at high concentrations. |
|  |  | Asphalt A |  |
| CKR-2103 plus boiled linseed oil | 5-20 | Asphalt B | Combination improved gloss, reduced embrittlement. |
|  | 1-3 | Asphalt A |  |
| Standard floor hardener (Phenol formaldehyde resin and tung oil vehicle-heat hardening). | 5-50 | --- | Improves gloss initially, but little improvement in gloss retention. |
| K rosin [1] | 6 | Asphalt C | Improved gloss slightly. Shortened weathering life. |

[1] Pine rosin of medium color grade.

Gloss was determined in each instance in a 60° Glossmeter manufactured by Gardner Laboratories, according to the standard method for this instrument. In this instrument a light is focused by means of a mirror. The surface gloss is measured at an angle of 60° from the normal. The reflected light is focused on a photoelectric cell, and the amount of light is read on the arbitrary scale of the meter. A comparison of the scale reading with surface appearance gives the following results.

Glossmeter reading:                         Visual
- Over 100 — Extremely glossy.
- 80–100 — Very glossy.
- 25–85 — Glossy.
- 15–25 — Fairly glossy.
- 5–15 — Slightly glossy.
- 2–5 — Very slightly glossy.
- Less than 2 — Dull.

In testing for gloss an asphalt cutback coating was applied to a metal panel to a thickness of 3 mils. The gloss was determined immediately after application, and later at once a week. The weathering test was completed after eight weeks. The gloss test was concluded after twenty weeks.

The next table embodies examples obtained by following the outlined procedure. The column numbers refer to the corresponding examples.

*Table III.—Outdoor weathering tests—Asphalt cutback coatings*

|  | 1 | 2 | 3 | 4 | 5 | 6 | 7 | 8 |
|---|---|---|---|---|---|---|---|---|
| Composition: |  |  |  |  |  |  |  |  |
| Asphalt A, percent | 58.0 | 48.0 | 42.0 | 37.0 |  |  |  |  |
| Asphalt B, percent |  |  |  |  | 52.5 | 42.0 | 38.5 | 36.0 |
| CKR-2103, percent |  | 10.0 | 15.0 | 20.0 |  | 10.0 | 15.0 | 20.0 |
| Aromatic solvent A | 42.0 | 42.0 | 43.0 | 43.0 | 47.5 | 48.0 | 46.5 | 44.0 |
| Gloss ratings: |  |  |  |  |  |  |  |  |
| Initial | 100 | 106 | 105 | 110 | 95 | 106 | 105 | 107 |
| After 2 days | 28 | 74 | 75 | 80 | 28 | 74 | 75 | 80 |
| After 3 weeks | 2 | 10 | 12 | 27 | 1 | 10 | 12 | 23 |
| After 4 weeks | 2 | 6 | 7 | 12 | 1 | 5 | 9 | 10 |
| After 10 weeks | 2 | 5 | 6 | 6 | 1 | 3 | 7 | 7 |
| After 19 weeks | 1 | 5 | 6 | 6 | 1 | 3 | 6 | 7 |

The data show the use of this resin allows the asphalt to retain the gloss up to at least 4 months.

I claim:

1. A coating composition consisting essentially of a cutback asphalt, derived from asphaltic crude and having a penetration of from 0 to 50 at 77° F., a softening point of from 140 to 230° F., and from 3% to 20% by weight of a non-heat hardening phenolic-formaldehyde resin having a softening point of from 210 to 320° F., a specific gravity of about 1.05 to 1.10 and a Gardner color index of 7 to 12 in one to one ratio in toluene.

2. A coating composition according to claim 1 containing from 1 to 3% boiled linseed oil.

References Cited by the Examiner
UNITED STATES PATENTS

| | | | |
|---|---|---|---|
| 2,485,327 | 10/49 | Snow | 260—28 |
| 2,861,895 | 11/58 | Hardman | 260—28 |
| 2,932,579 | 4/60 | Westlund | 106—278 |

MORRIS LIEBMAN, *Primary Examiner.*